United States Patent [19]

Katsuma

[11] Patent Number: 5,680,256
[45] Date of Patent: Oct. 21, 1997

[54] LENS FOR READING OUT OPTICAL RECORDING MEDIUM

[75] Inventor: Toshiaki Katsuma, Omiya, Japan

[73] Assignee: Fuji Photo Optical Co., Ltd., Omiya, Japan

[21] Appl. No.: 653,690

[22] Filed: May 23, 1996

[30] Foreign Application Priority Data

Aug. 10, 1995 [JP] Japan ................... 7-225787

[51] Int. Cl.$^6$ ................... G02B 3/02; G02B 27/30; G02B 13/18
[52] U.S. Cl. ................... 359/719; 359/718; 359/641
[58] Field of Search ................... 359/719, 718, 359/641, 647, 799, 800

[56] References Cited

U.S. PATENT DOCUMENTS

| | | | |
|---|---|---|---|
| 2,530,397 | 11/1950 | Merte | 359/718 |
| 4,449,792 | 5/1984 | Arai et al. | 359/719 |
| 4,571,034 | 2/1986 | Nakamura | 359/719 |
| 4,641,929 | 2/1987 | Braat | 359/719 |
| 4,657,352 | 4/1987 | Suda et al. | 359/719 |
| 4,671,623 | 6/1987 | Chikuma | 359/719 |
| 4,743,093 | 5/1988 | Oinen | 359/719 |
| 4,765,723 | 8/1988 | Takamura | 359/719 |
| 4,820,029 | 4/1989 | Iwai et al. | 359/719 |
| 4,828,373 | 5/1989 | Suda et al. | 359/718 |
| 4,842,388 | 6/1989 | Tanaka et al. | 359/718 |
| 4,863,248 | 9/1989 | Saka | 359/641 |
| 4,938,573 | 7/1990 | Saito | 359/719 |
| 5,087,115 | 2/1992 | Ishibai et al. | 359/719 |
| 5,162,949 | 11/1992 | Kubota | 359/718 |
| 5,384,659 | 1/1995 | Shikama et al. | 359/718 |
| 5,479,296 | 12/1995 | Maruyana et al. | 359/641 |

Primary Examiner—David C. Nelms
Assistant Examiner—Evelyn A. Lester
Attorney, Agent, or Firm—Ronald R. Snider

[57] ABSTRACT

The surface of a lens for reading out an optical recording medium facing a light source is formed as a convex aspheric surface which is rotationally asymmetrical with respect to the optical axis and defined by a predetermined aspheric surface equation, whereby, even when a light beam having an astigmatic aberration is emitted from the light source, a signal surface of the optical recording medium can be irradiated with a light beam whose astigmatic difference has been favorably corrected, while the lens can be easily manufactured. The surface of a single lens facing the light source is formed as a convex aspheric surface which is rotationally asymmetrical with respect to the optical axis and satisfies a predetermined aspheric surface equation, whereas its surface facing the optical disk is formed as a convex aspheric surface which is rotationally symmetrical with respect to the optical axis and satisfies a predetermined aspheric surface equation, and the radius of curvature of its surface facing the light source in xz cross section near the optical axis satisfies a predetermined expression. This single lens is used so as to eliminate the astigmatic difference of a laser beam (1) such that the beam spot can be efficiently narrowed on the signal surface (P).

3 Claims, 4 Drawing Sheets

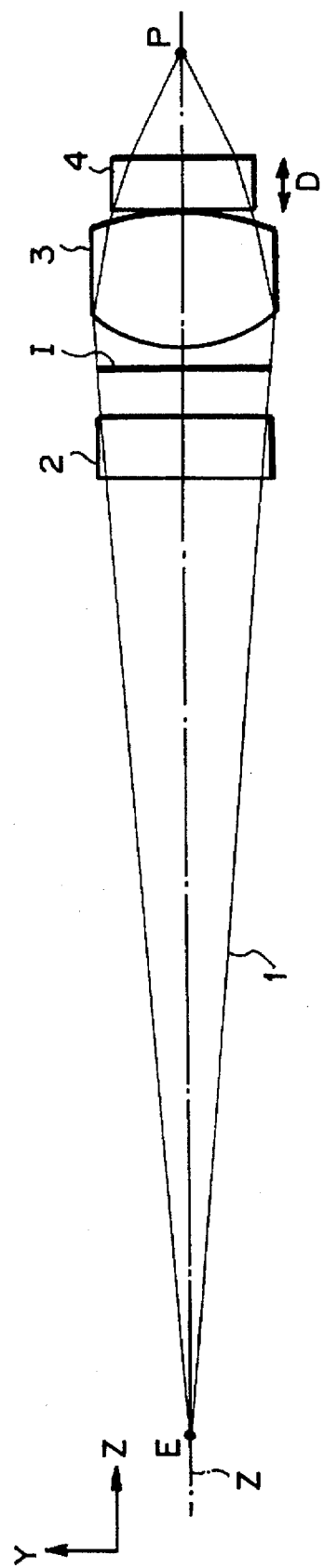

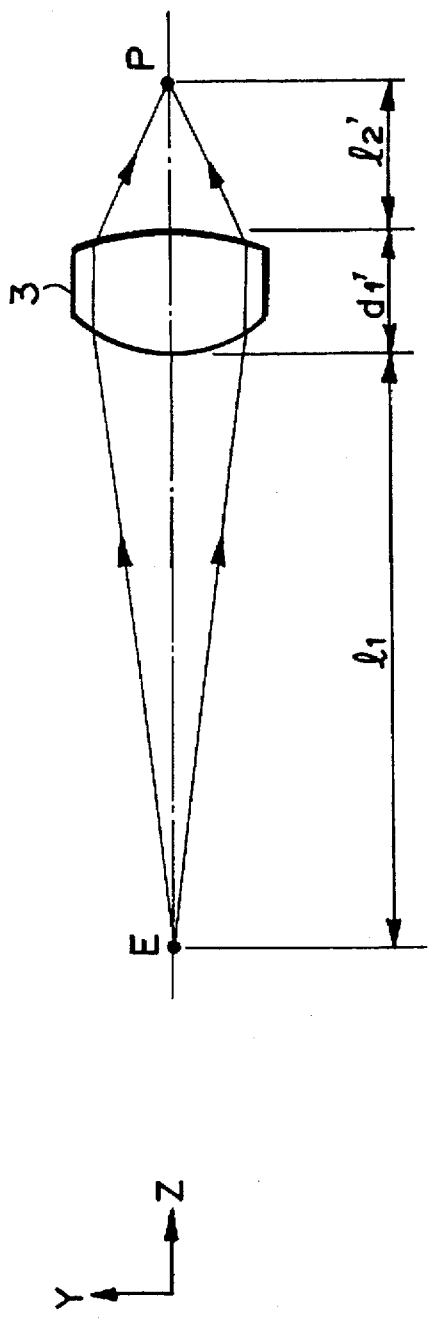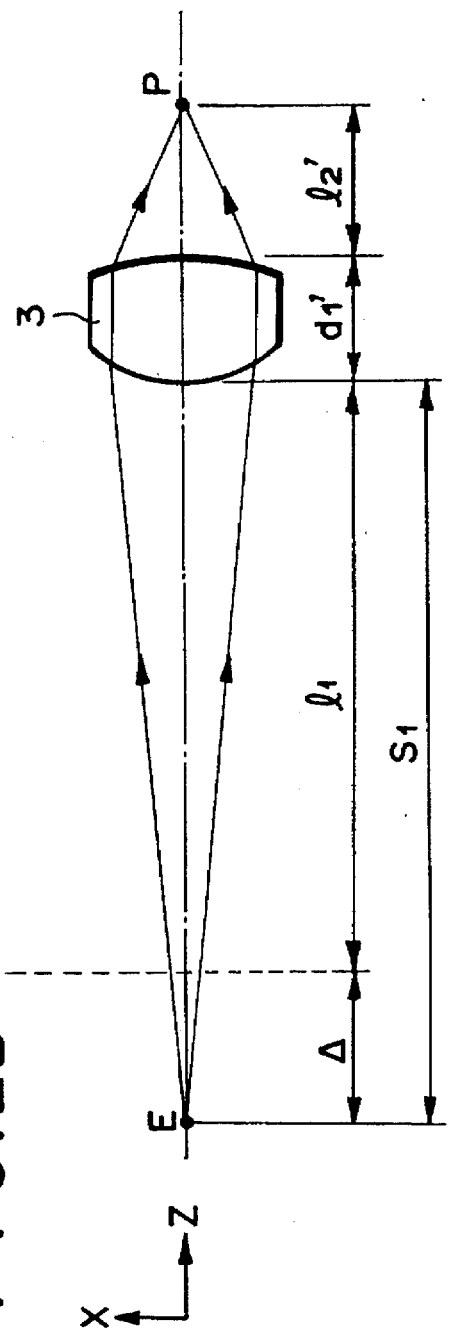
FIG. 2A
FIG. 2B

WAVE ABERRATION IN X-Z CROSS SECTION

WAVE ABERRATION IN Y-Z CROSS SECTION

WAVE ABERRATION IN X-Z CROSS SECTION

WAVE ABERRATION IN Y-Z CROSS SECTION

LENS FOR READING OUT OPTICAL RECORDING MEDIUM

RELATED APPLICATIONS

This application claims the priority of Japanese Patent Application No. 7-225787 filed on Aug. 10, 1995, which is incorporated herein by reference.

BACKGROUND OF THE INVENTION

1. Field of the Invention

The present invention relates to a signal pickup object lens used for reading out signals from optical recording media such as CD, CD-ROM, and DVD and, in particular, to a lens for reading out an optical recording medium using a semiconductor laser as a light source.

2. Description of the Prior Art

In recent years, various kinds of optical disks such as CD and CD-ROM have made remarkable progress. As their read-out light source, there have been used semiconductor lasers which have such excellent characteristics as small size, light weight, and high efficiency and can be subjected to high-speed direct modulation.

While such a semiconductor laser has the advantages mentioned above, the aspect ratio of its active area is not 1:1, whereby its beam divergence angle (half angle) in the vertical direction differs from that in the horizontal direction with respect to the junction surface in general. Also, since the beam waist positions in these two directions differ from each other, an astigmatic difference is likely to occur. Accordingly, there may be causes where the beam emitted therefrom is not easily handled as it is.

Namely, in the case where such a light beam having an astigmatic difference is to be converged by means of a typical convex lens, even when the lens has been designed to converge the light beam to its diffraction limit, the converged light may have difference waist positions in the above-mentioned two directions. Accordingly, it may become difficult to securely converge light onto a signal surface of the optical recording medium, whereby signals may not be easily read out with a high accuracy.

SUMMARY OF THE INVENTION

In view of these circumstances, the object of the present invention is to provide a lens for reading out an optical recording medium, which is easy to manufacture and, even when the light beam from the light source has an astigmatic difference, can irradiate the signal surface of the optical recording medium with read-out light whose astigmatic difference has been favorably corrected.

The lens for reading out an optical medium in accordance with the present invention is a lens which is disposed at a position facing the optical medium so as to converge a light beam having an astigmatic difference from a light source onto a signal surface of the optical recording medium to read out a signal recorded in the optical recording medium, wherein a surface of the lens facing the light source is made as a convex aspheric surface which is rotationally asymmetrical around an optical axis so as to correct the astigmatic difference and configured to satisfy the following conditional expression:

$$r_{x1} = \frac{(n-1) r_{y1} \cdot l_1 \cdot s_1}{r_{y1}(s_1 - l_1) + (n-1) l_1 \cdot s_1} \quad (1)$$

wherein:

$r_{x1}$: radius of curvature of a first surface (surface facing the light source; same hereinafter) in xz cross section (cross section which includes the optical axis and in which the light divergence angle is minimized at the light-emitting end of the light source) near the optical axis;

$r_{y1}$: radius of curvature of the first surface in yz cross section (cross section which includes the optical axis and in which the light divergence angle is maximized at the light-emitting end of the light source) near the optical axis;

$n$: refractive index of lens material;

$s_1$: object point position of xz cross section in the first surface; and $l_1$: object point position of yz cross section in the first surface.

Also, in the above-mentioned lens for reading out an optical recording medium, the surface facing the optical recording medium is preferably formed as a convex aspheric surface which is rotationally symmetrical around the optical axis.

Further, the above-mentioned lens for reading out an optical recording medium may be constituted by a single lens.

BRIEF DESCRIPTION OF THE DRAWINGS

FIG. 1 is a conceptual view (yz cross section) showing an optical system for reading out an optical disk using a lens for reading out an optical recording medium in accordance with an embodiment of the present invention;

FIGS. 2A and 2B are conceptual views for defining light beam paths and various distances of the lens shown in FIG. 1;

DETAILED DESCRIPTION OF THE PREFERRED EMBODIMENTS

Figure 3A:
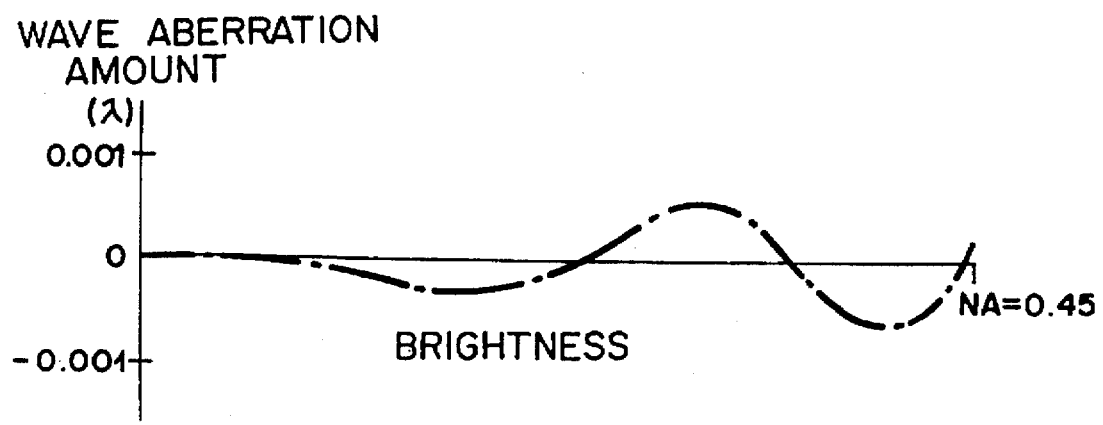
FIGS. 3A and 3B are graphs showing wave aberration amounts of a light beam when the lens shown in FIG. 1 is used.

In the following, embodiments of the present invention will be explained with reference to the drawings.

As shown in FIG. 1, a lens 3 for reading out an optical recording medium in accordance with this embodiment converges a laser beam 1 (with a wavelength of 780 nm), which diverges from a beam waist position E of a laser diode around an optical axis z, onto a signal surface P1 of the optical disk, while correcting its astigmatic difference.

In the optical system shown in FIG. 1, a stop I and a planar glass member (cover glass of the light source or the like) 2 having a thickness of 1.3 mm and a refractive index 1.519 are disposed between the light source and the lens 3, while a disk plate 4 having a thickness of 1.2 mm and a refractive index of 1.550 is disposed between the lens 3 and the convergence position P. However, the planar glass member 2 and the disk plate 4 are not actually disposed at their depicted positions which are optically equivalent positions for determining the convergence position P of the laser beam 1.

Here, the laser diode light source for emitting this laser beam 1 is a gain-waveguide type GaAlAs laser oscillating at about 780 nm. The cross section of its active area is so minute, e.g., about 0.1×2 μm, that divergence with a predetermined angle is effected upon diffraction. Also, since the aspect ratio of this area is not 1:1, the beam divergence angle (half angle) in the vertical direction and that in the horizontal direction with respect to the junction surface differ from each other. Specifically, the beam convergence angle in the direction perpendicular to the junction surface is about twice or three times as large as that in parallel to the junction surface. Also, the beam waist position in the beam direction in parallel to the junction surface is more inside of the emission end surface of the laser diode than that in the direction perpendicular to the junction surface, thereby generating an astigmatic difference.

When the laser beam 1 having an astigmatic difference is converged, as it is, by a lens which is rotationally symmetrical with respect to the optical axis, its waist position in the direction perpendicular to the junction surface differs from that in parallel to the junction surface, whereby the beam spot on the signal surface P of the optical disk cannot be efficiently narrowed.

Accordingly, this embodiment uses, as the lens 3 for reading out an optical recording medium, a single lens whose surface (referred to as "first surface" hereinafter) facing the light source is a convex aspheric surface which is rotationally asymmetrical with respect to the optical axis and whose surface (referred to as "second surface" hereinafter) facing the optical disk is a convex aspheric surface which is rotationally symmetrical with respect to the optical axis, so as to eliminate the astigmatic difference in the laser beam 1 such that the beam spot on the surface P can be efficiently narrowed.

Namely, when various distances of the laser beam 1 in yz cross section (beam cross section which includes the optical axis and is perpendicular to the hetero junction surface; cross section in which the light divergence angle is maximized) are defined as shown in FIG. 2A and various distances of the laser beam 1 in xz cross section (beam cross section which includes the optical axis and is in parallel to the hetero junction surface; cross section in which the light divergence angle is minimized) are defined as shown in FIG. 2B, the first surface and second surface of the lens 3 are aspheric surfaces respectively represented by the following conditional expressions (1) and (2):

Aspheric surface equation for the first surface:

$$z_1 = \frac{x_1^2/r_{x1} + y_1^2/r_{y1}}{1 + \{1 - (k_{x1}x_1^2/r_{x1}^2 + k_{y1}y_1^2/r_{y1}^2)\}^{1/2}} + \sum_{i=2}^{5} A_{i1}\{(1-B_{i1})x_1^2 + (1+B_{i1})y_1^2\}^i \quad (1)$$

wherein $r_{x1}$: radius of curvature in xz cross section near the optical axis;

$r_{y1}$: radius of curvature in yz cross section near the optical axis;

$k_{x1}$: xz cross section constant;

$k_{y1}$: yz cross section constant;

$x_1$: distance from the optical axis in x axis direction;

$y_1$: distance from the optical axis in y axis direction;

$A_{i1}$ (i=2 to 5): aspheric surface coefficient;

$B_{i1}$ (i=2 to 5): aspheric surface coefficient; and $z_1$: depth in the optical axis direction.

Aspheric surface equation for the second surface:

$$z_2 = \frac{h_2^2/r_2}{1 + (1 - k_2 h_2^2/r_2^2)^{1/2}} + \sum_{i=2}^{5} A_{i2}h_2^{2i} \quad (2)$$

wherein:

$r_2$: radius of curvature near the optical axis;

$h_2$: height from the optical axis;

$k_2$: constant;

$A_{i2}$ (i=2 to 5): aspheric surface coefficient; and $z_2$: depth in the optical axis direction.

The respective values (all of $r_{x1}$, $r_{y1}$, $x_1$, $y_1$, and $z_1$ being represented by mm unit) in the above-mentioned conditional expression (1) are set as follows:

Values for the first surface:

$r_{x1}$=2.8185

$r_{y1}$=2.8178

$A_{21}$=6.5231×10$^{-4}$ $A_{31}$=−3.1503×10$^{-5}$ $A_{41}$=−4.4491×10$^{-6}$ $A_{51}$=−4.2798×10$^{-6}$ $B_{21}$=−7.1454×10$^{-5}$ $B_{31}$=−9.3336×10$^{-6}$ $B_{41}$=−8.8169×10$^{-7}$ $B_{51}$=−2.3360×10$^{-5}$ $k_{x1}$=0.0

$k_{y1}$=0.0

The respective values (all of $r_2$, $h_2$, and $z_2$ being represented by mm unit) in the above-mentioned conditional expression (2) are set as follows:

Values for the second surface:

$r_2$=−4.8180

$A_{22}$=8.5011×10$^{-3}$ $A_{32}$=−1.2041×10$^{-3}$ $A_{42}$=3.9917×10$^{-5}$ $A_{52}$=1.7630×10$^{-6}$ $k_2$=0.0

Further, in the lens 3 of this embodiment, center thickness of the lens (axial distance from the first surface to the second surface) $d_1'$ is set to 3.05 mm, while refractive index n of the lens material is set to 1.537.

Also, the radius of curvature $r_{x2}$ of the second surface of the lens 3 in xz cross section near the optical axis is set as represented by the following conditional expression (3):

Radius of curvature of the first surface in xz cross section near the optical axis:

$$r_{x1} = \frac{(n-1)r_{y1} \cdot l_1 \cdot s_1}{r_{y1}(s_1 - l_1) + (n-1)l_1 \cdot s_1} \quad (3)$$

wherein $r_{x1}$: radius of curvature of the first surface (surface facing the light source; same hereinafter) in xz cross section (cross section which includes the optical axis and in which the light divergence angle is minimized at the light-emitting end of the light source) near the optical axis;

$r_{y1}$: radius of curvature of the first surface in yz cross section (cross section which includes the optical axis and in which the light divergence angle is maximized at the light-emitting end of the light source) near the optical axis;

n: refractive index of lens material;

$s_1$: object point position of xz cross section in the first surface; and $l_1$: object point position of yz cross section in the first surface.

Thus formed lens 3 was used under the condition in which the imaging magnification in yz cross section was −1/5.5 and astigmatic difference Δ of the laser beam 1 from the laser diode was 29.5 μm.

In this case, since the conditions of $l_1$=−24.1604 mm and $l_2'$=3.0924 mm were set, $s_1$=−24.1899 mm was attained, thereby finally yielding $r_{x1}$=2.8185 mm. It corresponded to the radius of curvature $r_{x1}$ of the first surface in xz cross section near the optical axis when the lens 3 had been designed.

Figure 3B:
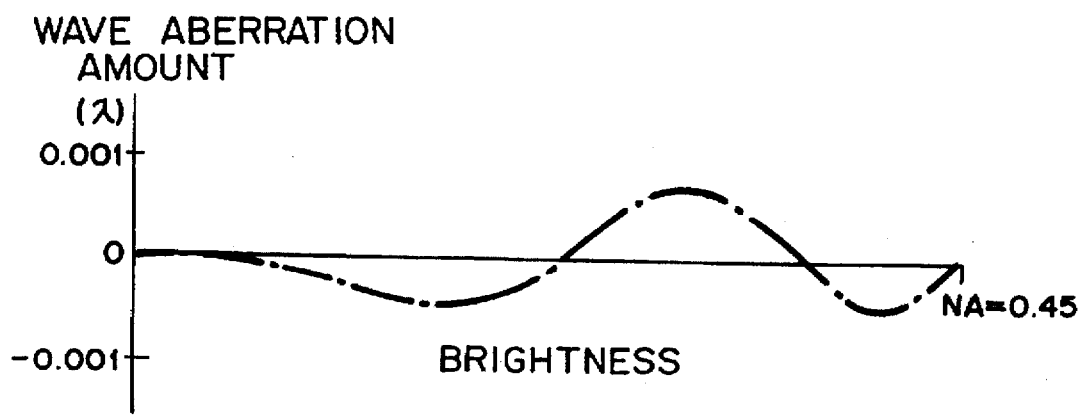
Figure 4A:
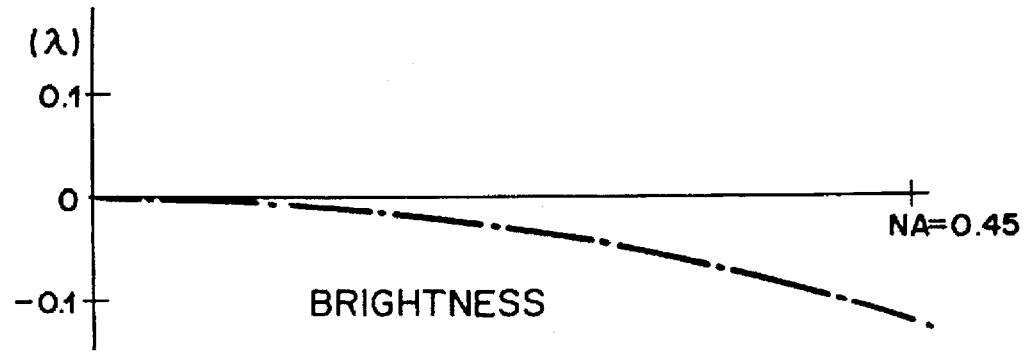
FIGS. 4A and 4B are graphs showing wave aberration amounts of a light beam when a conventional lens is used.
Figure 4B:
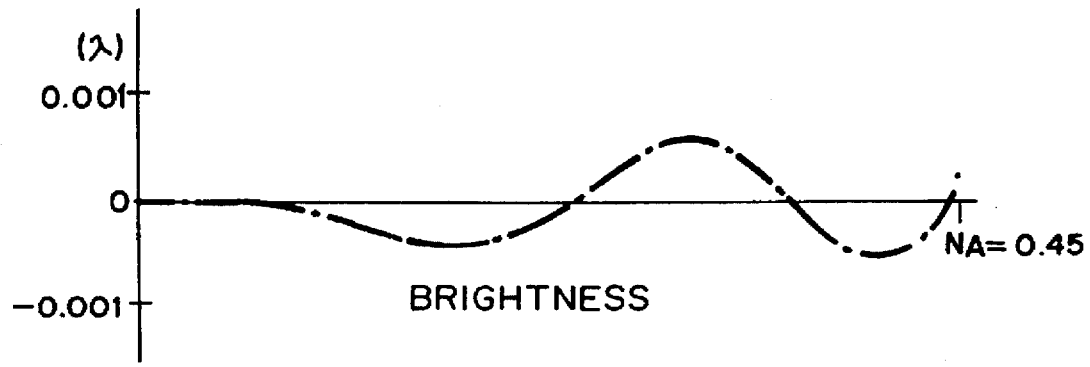

FIGS. 3A and 3B respectively show the wave aberration charts of xz cross section and yz cross section when the lens 3 is used. FIGS. 4A and 4B show the wave aberration charts (wherein the scale of the vertical axis for xz cross section differs from that of the other aberration charts) of a conventional lens in which each of the first and second surfaces is formed as a convex aspheric surface which is rotationally symmetrical with respect to the optical axis. When the wave aberration charts of FIGS. 3A and 3B are compared with those shown in FIGS. 4A and 4B, it is clearly understood that the amount of aberration in xz cross section is remarkably reduced.

Without being restricted to the above-mentioned embodiment, the lens for reading out an optical recording medium in accordance with the present invention can be modified in various manners. For example, the values in the above-mentioned aspheric surface equations may be changed. Also, the lens thickness and the refractive index of the lens glass material may be changed.

Also, the second surface of this lens may be formed as an aspheric surface which is rotationally asymmetrical with respect to the optical axis. This lens may also be formed as a composite lens comprising a plurality of lenses.

Further, the optical recording medium to be read out is not limited to the optical disk such as that mentioned above but can be various kinds or recording media such as optical magnetic disk, optical card, and optical magnetic card from which a signal can be read out by a light beam.

As explained in the foregoing, in the lens for reading out an optical recording medium of the present invention, the waist positions on the signal surface can coincide with each other in all the directions even when a light beam having an astigmatic difference is used as read-out light, whereby the signal surface can be irradiated with the light beam whose astigmatic difference has been favorably corrected.

Accordingly, the beam spot diameter on the signal surface can be made smaller than that conventionally available, whereby the read-out performance can be improved.

Also, since the equations representing the above-mentioned lens surface forms have simple configurations, the lens can be designed and manufactured easily.

What is claimed is:

1. A lens for reading out an optical recording medium, said lens being disposed at a position facing said optical medium so as to converge a light beam having an astigmatic difference from a light source onto a signal surface of said optical recording medium to read out a signal recorded in said optical recording medium, wherein a surface of said lens facing said light source is made as a convex aspheric surface which is rotationally asymmetrical around an optical axis so as to correct said astigmatic difference and configured to satisfy the following conditional expression:

$$r_{x1} = \frac{(n-1)r_{y1} \cdot l_1 \cdot s_1}{r_{y1}(s_1 - l_1) + (n-1)l_1 \cdot s_1} \tag{1}$$

wherein:

$r_{x1}$: radius of curvature of a first surface (surface facing the light source; same hereinafter) in xz cross section (cross section which includes the optical axis and in which the light divergence angle is minimized at a light-emitting end of the light source) near the optical axis;

$r_{y1}$: radius of curvature of the first surface in yz cross section (cross section which includes the optical axis and in which the light divergence angle is maximized at the light-emitting end of the light source) near the optical axis;

n: refractive index of lens material;

$s_1$: object point position of xz cross section in the first surface; and $l_1$: object point position of yz cross section in the first surface.

2. A lens for reading out an optical recording medium according to claim 1, wherein the surface of said lens facing the optical recording medium is formed as a convex aspheric surface which is rotationally symmetrical around the optical axis.

3. A lens for reading out an optical recording medium according to claim 1, wherein said lens is constituted by a single lens.

* * * * *